United States Patent
Caufield et al.

(10) Patent No.: US 9,983,906 B2
(45) Date of Patent: *May 29, 2018

(54) DYNAMIC OPTIMIZATION OF WORKLOAD EXECUTION BASED ON STATISTICAL DATA COLLECTION AND UPDATED JOB PROFILING

(71) Applicant: International Business Machines Corporation, Armonk, NY (US)

(72) Inventors: Brian K. Caufield, Livermore, CA (US); Lawrence A. Greene, Plainville, MA (US); Eric A. Jacobson, Arlington, MA (US); Yong Li, Newton, MA (US); Xiaoyan Pu, Chelmsford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/621,719

(22) Filed: Feb. 13, 2015

(65) Prior Publication Data

US 2015/0261572 A1  Sep. 17, 2015

Related U.S. Application Data

(63) Continuation of application No. 14/205,080, filed on Mar. 11, 2014.

(51) Int. Cl.
G06F 9/48 (2006.01)
G06F 9/50 (2006.01)
G06F 11/34 (2006.01)

(52) U.S. Cl.
CPC .............. *G06F 9/4843* (2013.01); *G06F 9/50* (2013.01); *G06F 11/34* (2013.01)

(58) Field of Classification Search
CPC ........... G06F 9/4843; G06F 9/50; G06F 11/34
See application file for complete search history.

(56) References Cited

U.S. PATENT DOCUMENTS

| | | | |
|---|---|---|---|
| 5,627,944 A | 5/1997 | Fujimoto et al. | |
| 6,643,609 B2 * | 11/2003 | Phan .................... | G06F 11/3409 702/178 |
| 7,000,227 B1 * | 2/2006 | Henry ..................... | G06F 8/443 717/146 |
| 7,069,479 B2 * | 6/2006 | Hester ................. | G06F 11/3485 714/33 |

(Continued)

OTHER PUBLICATIONS

Caufield, et al.: "Optimizing Parallel Data Flows With Generated Job Profile Data", U.S. Appl. No. 14/205,080, filed Mar. 11, 2014.

*Primary Examiner* — Benjamin C Wu
(74) *Attorney, Agent, or Firm* — Patterson + Sheridan, LLP

(57) ABSTRACT

Embodiments presented herein provide techniques for optimizing parallel data flows of a batch processing job using a profile of the processing job. An application retrieves a job profile for a processing job. The processing job has a plurality of processing stages specified in an execution profile. The job profile includes statistical data for at least one of the processing stages obtained during prior executions of the job. The application modifies properties of the execution profile based on the job profile to optimize the execution of the job. The application executes the processing job with the modified execution profile.

7 Claims, 7 Drawing Sheets

(56) References Cited

U.S. PATENT DOCUMENTS

| | | | |
|---|---|---|---|
| 7,814,142 B2 | 10/2010 | Mamou et al. | |
| 7,904,894 B2 | 3/2011 | Entin et al. | |
| 8,209,664 B2 | 6/2012 | Yu et al. | |
| 8,281,012 B2 | 10/2012 | Pu et al. | |
| 8,417,499 B2* | 4/2013 | Chen | G06F 9/50 |
| | | | 703/13 |
| 8,713,578 B2* | 4/2014 | Cardelli | G06F 9/4887 |
| | | | 718/106 |
| 2004/0044718 A1* | 3/2004 | Ferstl | G06F 9/5044 |
| | | | 709/200 |
| 2004/0236924 A1* | 11/2004 | Johnson | G06F 12/08 |
| | | | 711/173 |
| 2005/0076043 A1* | 4/2005 | Benedetti | G06F 9/5083 |
| 2006/0010449 A1* | 1/2006 | Flower | G06F 9/5033 |
| | | | 718/102 |
| 2006/0048154 A1* | 3/2006 | Wu | G06F 9/4843 |
| | | | 718/101 |
| 2007/0083588 A1* | 4/2007 | Keller | G06F 9/5038 |
| | | | 709/202 |
| 2007/0174290 A1* | 7/2007 | Narang | G06F 17/30539 |
| 2007/0234240 A1* | 10/2007 | Entin | G06F 11/3476 |
| | | | 716/132 |
| 2009/0183162 A1* | 7/2009 | Kindel | G06F 9/4843 |
| | | | 718/103 |
| 2011/0047525 A1 | 2/2011 | Castellanos et al. | |
| 2011/0061057 A1 | 3/2011 | Harris et al. | |
| 2011/0107341 A1* | 5/2011 | Longobardi | G06F 9/5033 |
| | | | 718/102 |
| 2011/0154358 A1* | 6/2011 | Di Balsamo | G06F 9/505 |
| | | | 718/105 |
| 2013/0268941 A1* | 10/2013 | Cherkasova | G06F 9/5066 |
| | | | 718/104 |
| 2013/0290968 A1* | 10/2013 | Jiang | G06F 9/4843 |
| | | | 718/102 |
| 2013/0318536 A1* | 11/2013 | Fletcher | G06F 9/5011 |
| | | | 718/104 |
| 2013/0339972 A1* | 12/2013 | Zhang | G06F 9/5066 |
| | | | 718/104 |
| 2013/0346988 A1* | 12/2013 | Bruno | G06F 9/5066 |
| | | | 718/102 |
| 2014/0380320 A1* | 12/2014 | Lin | G06F 9/4881 |
| | | | 718/102 |
| 2015/0172204 A1* | 6/2015 | Anderson | H04L 47/70 |
| | | | 709/224 |
| 2017/0104627 A1* | 4/2017 | Bender | H04L 47/765 |

* cited by examiner

☐ Generate profile data
☐ Use generated profile data
☐ Enable sort optimization
☐ Enable transfer block optimization
☐ Enable buffer block optimization
☐ Enable record layout optimization
☐ Enable bounded field optimization
☐ Enable parallelization optimization

SUBMIT

INTERFACE 300

FIGURE 3

```
<ProfileData>
  <StageType>Sort</StageType>
  <StageName>SortData</StageName>
  <StagePartition>0</StagePartition>
  <Field name="key" >
    <Read>4897</Read>
    <Write>4897</Write>
  </Field>
  <Field name="data" >
    <Read>4897</Read>
    <Write>4897</Write>
  </Field>
  <InputLink>
    <LinkNumber>0</LinkNumber>
    <DataKB>63488</DataKB>
    <Records>4897</Records>
  </InputLink>
  <OutputLink>
    <LinkNumber>0</LinkNumber>
    <DataKB>63488</DataKB>
    <Records>4897</Records>
  </OutputLink>
  <SortProfile>
    <MemoryBlockSizeKB>20480</MemoryBlockSizeKB>
    <DataSpilledKB>10240</DataSpilledKB>
  </SortProfile>
</ProfileData>
```

FIGURE 5

DYNAMIC OPTIMIZATION OF WORKLOAD EXECUTION BASED ON STATISTICAL DATA COLLECTION AND UPDATED JOB PROFILING

CROSS-REFERENCE TO RELATED APPLICATION

This application is a continuation of co-pending U.S. patent application Ser. No. 14/205,080, filed Mar. 11, 2014. The aforementioned related patent application is herein incorporated by reference in its entirety.

BACKGROUND

Enterprise systems employ a variety of approaches to process data. For example, an enterprise may employ batch extract, transform, and load (ETL) processes to retrieve data from external sources (e.g., databases), process as needed by a given enterprise, and store the data in a destination source (e.g., data warehouses, operational data stores, etc.). A developer may design ETL data flows to process the enterprise data sets. Typically, once developed, an ETL data flow may be executed on similar input data sets.

One common issue in running batch processes on data sets includes using system resources effectively to perform the processes in a relatively fast manner. This issue presents a challenge to developers who, in trying to increase efficiency, may tune different parameters of the data flow design, such as adjusting memory block size, increasing a degree of parallelism, etc. Tuning these parameters often involves a significant amount of tedious guesswork and system monitoring to identify and resolve performance issues.

SUMMARY

Embodiments presently disclosed herein provide a method. The method generally includes retrieving, via a processor, a job profile for the processing job. The processing job has a plurality of processing stages specified in an execution profile. The job profile includes statistical data for at least one of the processing stages obtained during prior executions of the job. The method also generally includes modifying properties of the execution profile based on the job profile to optimize execution of the job. The method also generally includes executing the processing job with the modified execution profile.

Another embodiment of the invention includes a computer program product, the computer program product comprising a computer-readable storage medium having computer-readable program code embodied therewith. The code, when executed on a processor, may generally perform an operation. The operation generally includes retrieving, via a processor, a job profile for the processing job. The processing job has a plurality of processing stages specified in an execution profile. The job profile includes statistical data for at least one of the processing stages obtained during prior executions of the job. The operation also generally includes modifying properties of the execution profile based on the job profile to optimize execution of the job. The operation also generally includes executing the processing job with the modified execution profile.

Still another embodiment of the invention includes a system having a processor and a memory containing an operation. The operation generally includes retrieving, via a processor, a job profile for the processing job. The processing job has a plurality of processing stages specified in an execution profile. The job profile includes statistical data for at least one of the processing stages obtained during prior executions of the job. The operation also generally includes modifying properties of the execution profile based on the job profile to optimize execution of the job. The operation also generally includes executing the processing job with the modified execution profile.

BRIEF DESCRIPTION OF THE SEVERAL VIEWS OF THE DRAWINGS

FIG. 3 illustrates an example interface for the application that allows a developer to gather profile data and optimize data flows for a processing job using the profile data, according to one embodiment.

FIG. 5 illustrates example profile data obtained by an application for a sort stage operation, according to one embodiment.

DETAILED DESCRIPTION

Figure 1:
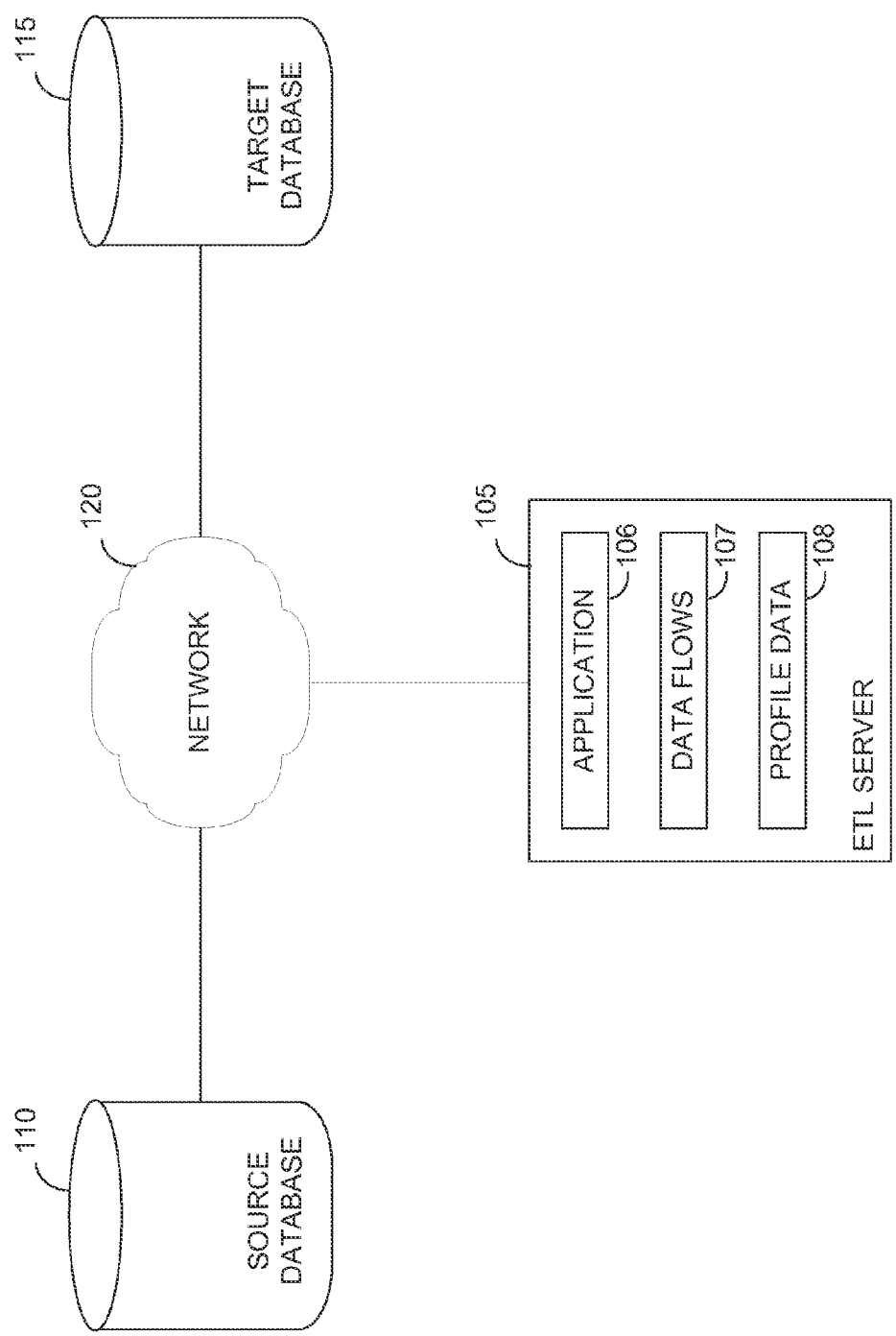
FIG. 1 illustrates an example computing environment, according to one embodiment.

Developers frequently use trial-and-error adjustments to tune a data flow of a job to achieve better performance. For example, in extract, transform, and load (ETL) processing jobs, the developer may adjust memory block size or a degree of parallelism for better efficiency and faster performance. However, identifying which particular parameters to tune, as well as optimal settings for such parameters often requires a significant amount of guesswork and time.

For example, assume a developer creates a parallel data processing job that processes 100 GB of data from a database using four ETL servers and that the processing job requires that incoming data be sorted before removing any duplicate records. Further, assume that a default sort memory block is 20 MB. With this block size, the servers may use sorting algorithms that require many non-final merge operations with sort files on disk. This results in higher disk input and output operations, slowing performance overall. If the developer does not immediately identify the cause of the problem, the developer might spend a considerable amount of time determining the cause and experiment with several different block sizes to determine how to reduce the number of the non-final merge operations.

Consider another example where a processing job processes 10 MB of data that requires five different sort operations. If the default sort memory block size is 20 MB, then the resulting process uses 100 MB total for the sort operations, even though only 50 MB is actually required.

Embodiments presented herein provide techniques for optimizing data flows using profile data generated from executing batch processing jobs, such as ETL processing jobs. For example, an underlying server application may perform guided optimizations on a batch processing job, using information obtained from a previous runs on of that job (e.g., using a similar data set). In one embodiment, the server application gathers statistical data during runtime of a parallel processing job. Such statistical data may include total data processed, average record size processed, access patterns of records, data used in lookup tables, etc. The application generates a profile based on the statistical data. During subsequent runs of the processing job (e.g., using similar input data sets), the application applies the profile to the processing job to optimize specified aspects of job stages, such as in sort operations, block sizes, and parallelization. In one embodiment, the application may provide an interface used to generate and apply a profile to a batch job. For example, after a developer has written a processing job, the developer may specify, through the interface, to run the processing job on an input data set and generate a profile based on the job. In response, the server application produces the profile from statistical data collected at each processing stage (e.g., sort, partition, compress, etc.) The developer may then specify, through the interface, to apply the profile to the processing job to subsequent runs of that job (e.g., with the same data set or subsequent data sets). The interface may allow the developer to specify particular optimizations to perform during subsequent runs, such as sort operation optimizations, parallelization optimizations, record layout optimizations, and so on. The application optimizes the processing job based on the specified optimizations and runs the optimized processing job.

A profile generated for a batch job allows subsequent runs of a processing job to be optimized. Applying optimizations based on the profile significantly reduces the need to monitor system performance to identify optimizations, particularly for new jobs. That is, self-tuning optimizations may improve the original batch processing job. Further, once tuned, a sophisticated user may fine-tune the profile-based optimizations. This approach also reduces the need for manual tuning by the developer to obtain increased processing job performance. For example, if the profile or input data changes over time, the developer may generate new profile data without needing to manually re-optimize the job.

Note, the following description relies on an extract, transform, and load (ETL) architecture as a reference example of a computing infrastructure that uses generated profile data for parallel data flows to optimize performance of the data flows when subsequently run. However, one of skill in the art will recognize that the techniques described herein are applicable in other contexts related to gathering statistical data at a data flow level for use in subsequently improving performance of processes in a data flow. For example, the techniques may generally be adapted to systems configured to perform batch processing, such as for automated transaction processing, watermarking, file format conversion, and the like.

FIG. 1 illustrates an example computing environment 100, according to one embodiment. As shown, the computing environment 100 includes an ETL server 105 connected to a network 120. The ETL server 105 may be a physical computing system (e.g., a system in a data center) or may be a virtual computing instance executing within a computing cloud. Generally, the ETL server 105, through an application 106, performs parallel batch processing jobs to retrieve data from a source database 110, transform the data to conform to specified operational needs, and store the transformed data into a target database 115 (e.g., a data warehouse, a data store, etc.). An example of an ETL processing job performed by the application 106 may include a sequential file read operation, a sorting operation, and a peek operation.

Illustratively, the ETL server 105 includes the application 106, data flows 107, and profile data 108. In one embodiment, the application 106 is further configured to generate profile data 108 for the data flows 107 based on statistical data gathered from running the data flows 107. Generally, a parallel processing job has many independent threads or processes executing different logic on data flowing through the job. The application 106 gathers profile data at each process. Once generated, the application 106 may apply the profile data 108 to optimize the performance of the data flows 107.

As stated, the profile data 108 includes statistical data for a data flow 107. The application 106 uses the gathered data to tune various parameters of the data flow 107 in subsequent runs of the data flow 107. For example, assume that the data flow 107 includes a sort operation. During an initial run of the data flow 107, the application 106 may gather total data processed by each sort instance in the data flow 107. The application 106 may later use this statistic to tune memory blocks used in each sort instance to avoid computationally-expensive non-final merge operations. As another example, the application 106 may gather processor usage data for each process within the data flow 107. The application 106 may later use the usage data to identify operators that may benefit from increased parallelism. Other examples of statistical data gathered for the profile data 108 may include an average record size processed by inter-process data transfer blocks (e.g., used to tune each in-memory transfer blocks in the processing job), a maximum fill percentage buffer (e.g., used to increase the size of the memory block used by the buffer to avoid spillage to disk), access patterns of record fields for each process (e.g., used to modify a record layout to place fields accessed more often to increase access speed), average actual data size for bounded fields (e.g., used to tune an internal representation of bounded length fields to reduce memory usage), presence of bottlenecks (e.g., used to increase parallelism to eliminate the bottlenecks), data used in lookup tables (e.g., used to reduce an amount of chaining in the tables), data content (e.g., used to determine compression algorithms used for compressing in-flight data or blocks of data), memory usage of join stages (e.g., used to determine areas where the memory usage can be reduced), and so on.

Figure 2:
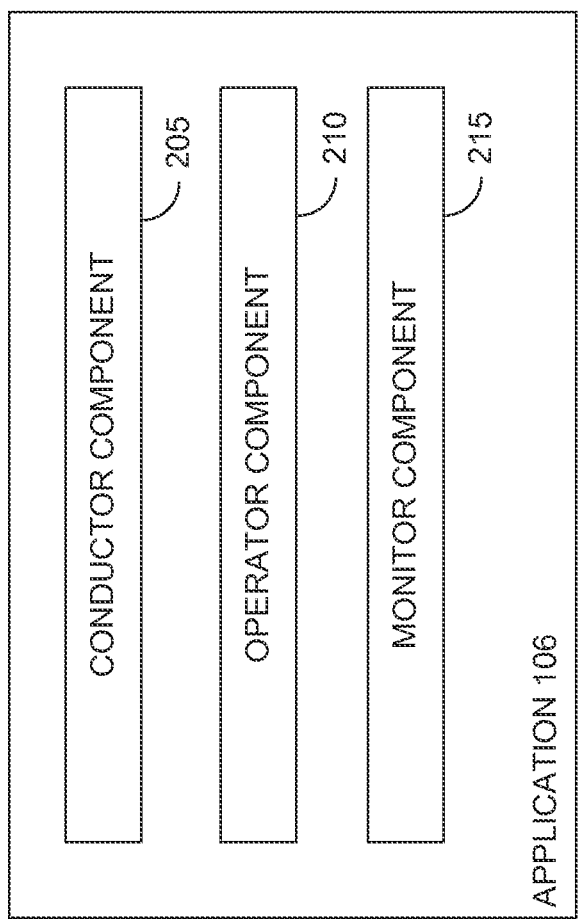
FIG. 2 illustrates an example application configured to gather profile data and apply the profile data to processing jobs to increase performance, according to one embodiment.

FIG. 2 further illustrates the application 106 configured to gather profile data and apply the profile data to processing jobs to increase performance, according to one embodiment. As shown, the application 106 includes a conductor component 205, an operator component 210, and a monitor component 215. The conductor component 205 configures and launches processing jobs. Further, the conductor component 205 provides modules for creating an execution plan of a processing job. The modules invoke operations included in the job and pass profile parameters specific to each operation. In addition, the conductor component 205 includes a module that processes framework-specific profile data and tunes framework parameters based on a set of rules. The conductor component 205 serializes the execution plan with the optimized framework and profile parameters and passes the parameters to the operator component 210.

The operator component 210 includes various modules for gathering profile data for each running process of the processing job. For instance, the operator component 210 may include a module for gathering statistical data for general features of the processing job, such as an amount of data processed by input and output data sets. The operator component 210 may also include modules for gathering profile data specific to certain operations of the processing job, such as profile data specific to sort operations or lookup operations. To do so, each operation may include a flag that indicates to the operator component 210 to collect specific profile data. Such modules provide the information needed to increase the performance of such operations. The monitor component 215 stores job run-time data relayed by the conductor component 205.

FIG. 3 illustrates an interface 300 for the application 106 that allows a developer to gather profile data and optimize data flows for a processing job using the profile data, according to one embodiment. As shown, the interface 300 may provide two main options to the developer. One option is to generate profile data. After a developer has finished designing a data flow for a processing job, the developer runs a processing job with this option enabled. With this option enabled, the application 106 gathers profile data for each processing stage of the data flow and stores the profile data as a file for future use.

The other main option that the interface 300 provides is to use generated profile data on the same processing job (e.g., on similar sets of input data). After the application 106 has generated profile data for a particular processing job, the developer may select, through the interface 300, this option and multiple optimization options for improving the performance of the processing job.

The interface 300 provides several examples of optimizations that the developer may select. Illustratively, the interface 300 allows the developer to specify optimizations in sort operations, transfer block size, buffer block size, record layout, bounded field, and parallelization. When the application 106 receives a selection of optimizations, the application 106 performs the selected optimizations on the data flow and then runs the optimized data flow.

Figure 4:
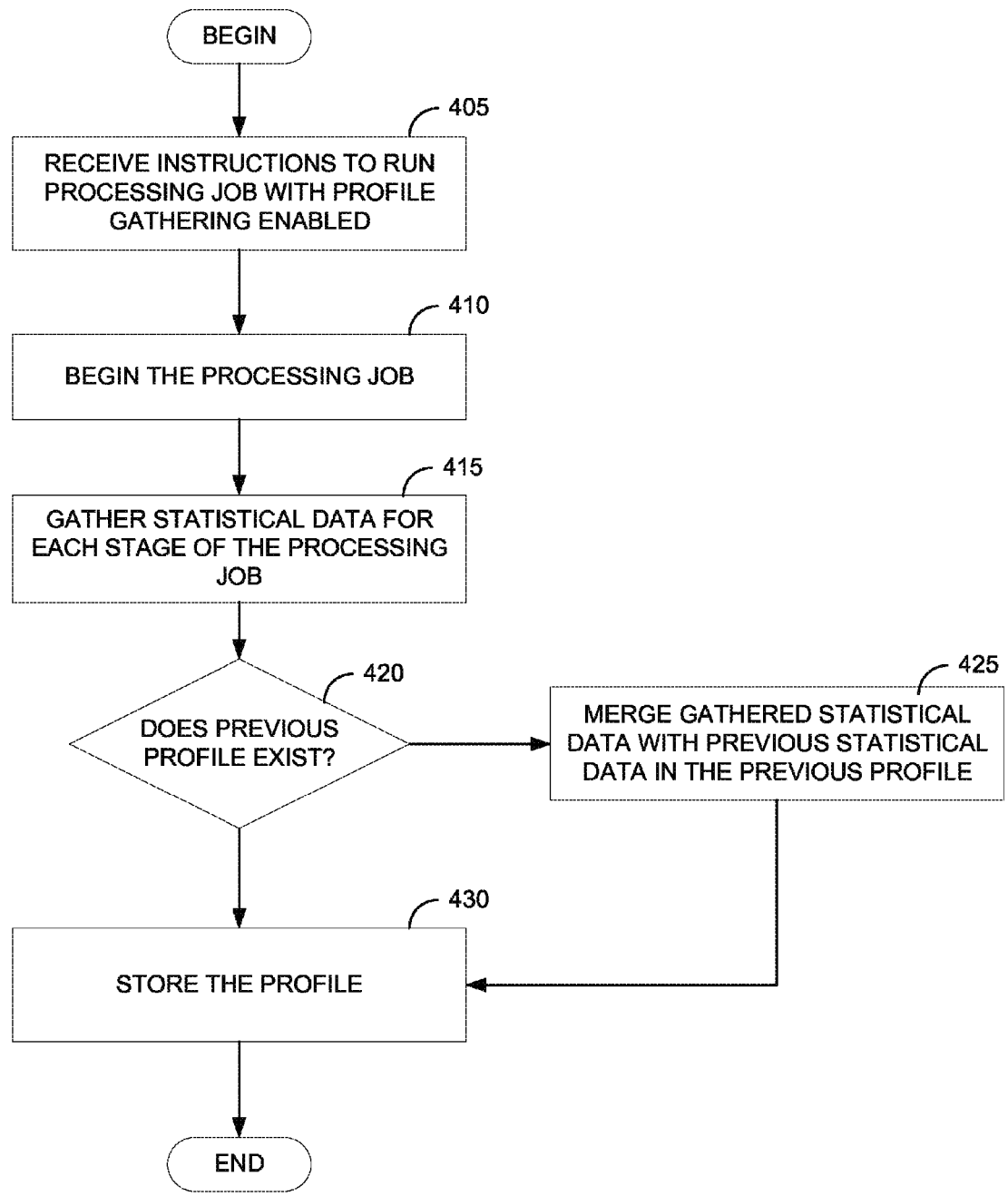
FIG. 4 illustrates a method for gathering profile data of a processing job, according to one embodiment.

FIG. 4 illustrates a method for gathering profile data of a processing job, according to one embodiment. At step 405, the application 106 receives an indication (e.g., from a developer) to run a batch processing job and gather profile data during the run. The application 106 transmits the indication to the operator component to gather profile data during each stage of the batch processing job. At step 410, the conductor component of the application 106 initiates the batch processing job.

At step 415, at each stage of the job, the operator component of the application 106 gathers profile data. As stated, the operator component gathers data that is general to the processing job (e.g., data amounts) and data that is specific to each stage of the processing job. To gather data that is specific to a given stage, the operator component may detect whether the corresponding operation has a flag that indicates whether specified data should be collected for the stage. If so, the operator component gathers the specific data. For example, a sort stage may have such a flag set. The operator component detects the flag and may gather information during the stage, such as block size information, the overall size of data being processed, etc. The operator component, after gathering data at each stage, inserts the data in a profile data file.

At step 420, the application 106 determines whether a previous profile data file for the job exists. If so, at step 425, the application 106 merges the gathered profile data with the profile data stored with the ETL server into a single profile data file. By merging newly gathered profile data of a subsequently processed run with existing data of a previously processed run, the application 106 may make further optimizations for the processing job. At step 430, the ETL server stores the profile data.

FIG. 5 illustrates example profile data obtained by the application 106 for a sort stage operation, according to one embodiment. Illustratively, the profile data corresponds to statistical data obtained for a sort stage on a data partition in a processing job. As shown, the profile data for the sort stage includes general profile information for the partition, such as a stage type, a stage name, and partition identifier. The application 106 collects and stores the profile data as operational metadata specific to the processing job.

The profile data further provides information specifically gathered for a sort operation, such as a memory block size used in kilobytes and an amount of data spilled to disk in kilobytes. According to the information collected, the memory block size used in this sort stage was 20,480 KB (i.e., 20 MB), and the amount of data spilled to disk was 10,240 KB (i.e., 10 MB) of data was spilled to disk. In subsequent runs, the application 106 may increase the memory block size to avoid the cost of spilling data to the disk.

Figure 6:
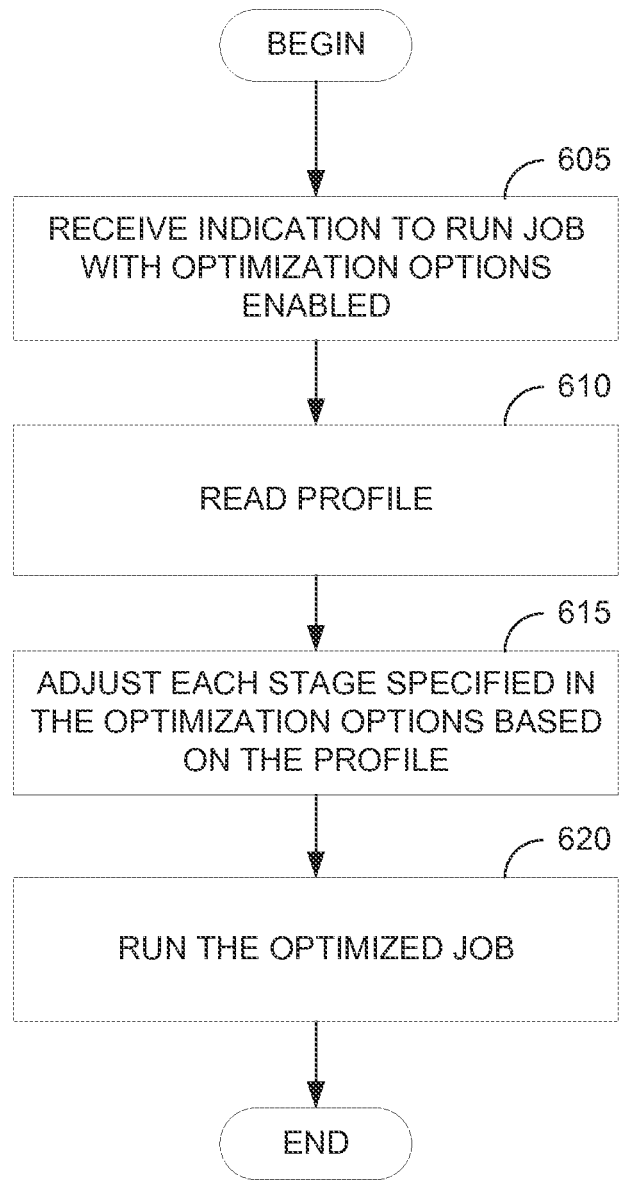
FIG. 6 illustrates a method for applying a profile to a processing job to optimize the processing job, according to one embodiment.

FIG. 6 illustrates a method for applying a profile to a processing job to optimize the processing job, according to one embodiment. Assume that a developer had previously run a given processing job through the application 106 and generated profile data for the processing job. At step 605, the application 106 receives an indication (e.g., from a developer) to run the processing job with optimizations enabled. For example, assume that a developer, through an interface of the application 106, enables the application 106 to optimize sort operations for a processing job for 10 MB of data that requires five separate sort operations.

At step 610, the application 106 loads the profile data file. In one embodiment, the application 106 gather profile data in subsequent runs. Therefore, the profile data file may include data from multiple profile gathering runs. If so, the conductor component of the application 106 merges the multiple runs into a single execution plan. By obtaining statistical data for the profile during subsequent runs of a processing job, the application 106 may make further optimizations to the data flows of the processing job.

At step 615, the conductor component scans each stage of the execution plan and determines whether to apply any applicable profile data optimizations to the stage. For example, if the application 106 previously received an indication to optimize sort operations, the operator component applies optimizations based on information gathered in a previous run and stored in the profile data file. Continuing the example of the processing job described above, assume that the default sort memory block size is 20 MB. Without any optimizations, running the job process uses 100 MB total in sort operations, although only 50 MB is required. However, based the information provided in the profile, the conductor component adjusts the sort memory block size to 10 MB.

At step 620, the conductor component runs the optimized processing job. Continuing the previous example, assume that the conductor component adjusted the sort memory block size to 10 MB. As a result, the processing job uses only 50 MB in performing sort operations during the sort stage of the processing job, allowing for increased efficiency in running the processing job.

Figure 7:
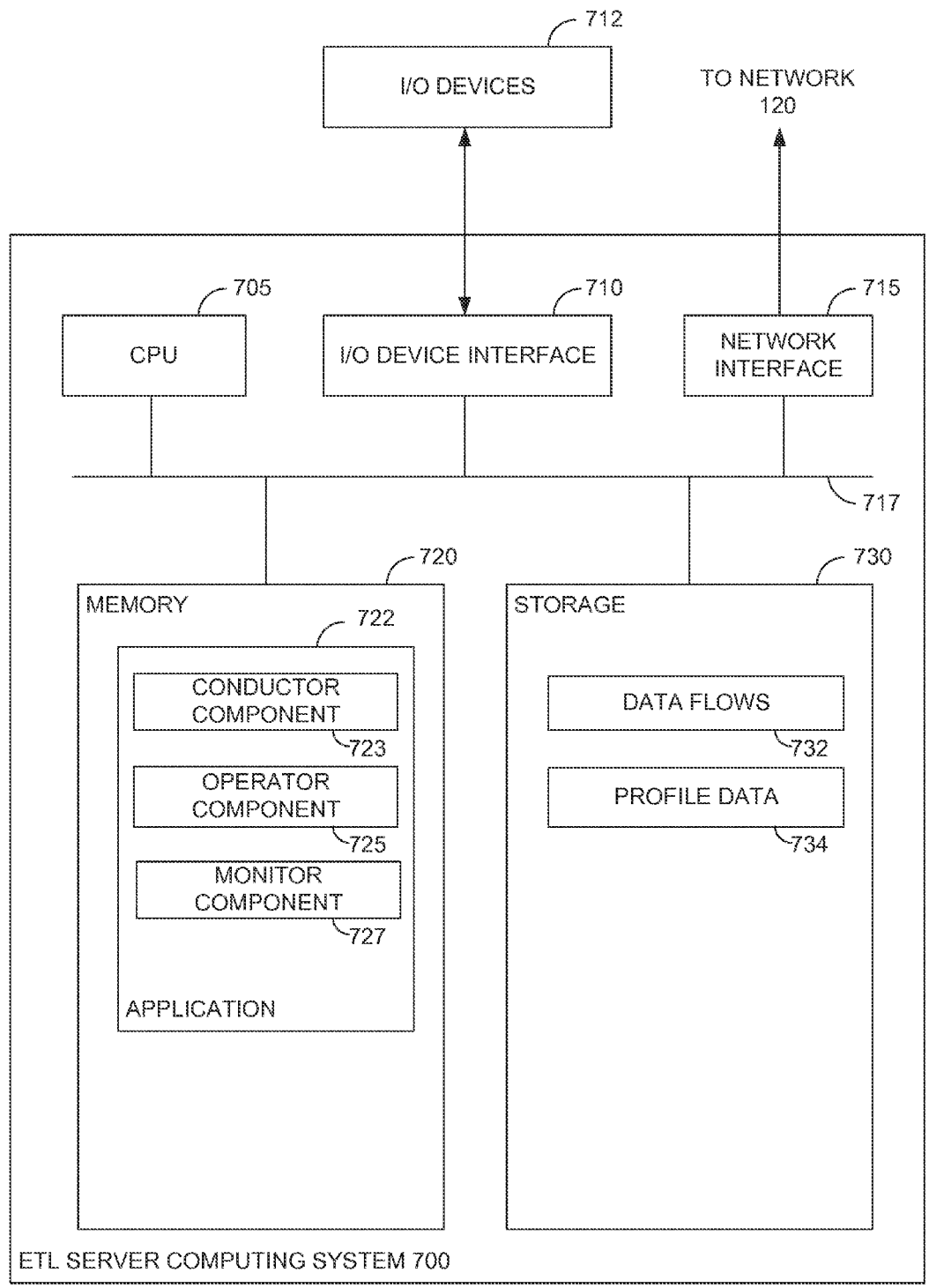
FIG. 7 illustrates an example server computing system, according to one embodiment.

FIG. 7 illustrates an example ETL server computing system 700, according to one embodiment. As shown, the server computing system 700 includes, without limitation, a central processing unit (CPU) 705, a network interface 715, an interconnect (i.e., bus) 717, a memory 720, and storage 730. The server computing system 700 also may include an I/O device interface 710 connecting I/O devices 712 (e.g., keyboard, display, and mouse devices) to the ETL server computing system 700.

The CPU 705 may retrieve and execute programming instructions stored in the memory 720. Similarly, the CPU 705 may retrieve and store application data residing in the memory 720. The interconnect 717 may facilitate transmission, such as of programming instructions and application data, among the CPU 705, I/O device interface 710, storage 730, network interface 715, and memory 720. CPU 705 is included to be representative of a single CPU, multiple CPUs, a single CPU having multiple processing cores, and the like. Additionally, the memory 720 is included to be representative of a random access memory. Furthermore, the storage 730 may be a disk drive storage device. As shown, the memory 720 includes the application 722.

Although shown as a single unit, the storage 730 may be a combination of fixed and/or removable storage devices, such as fixed disc drives, floppy disc drives, tape drives, removable memory cards or optical storage, network attached storage (NAS), or a storage area-network (SAN). As shown, the storage 730 includes data flows 732 and profile data 734.

The application 722 is configured to run ETL processing jobs. In one embodiment, the application 722 is further configured to generate profile data 734 based on the data flows 732 of the ETL processing jobs. In addition, the application 722 is configured to modify the data flows 732 using the generated profile data 732 to improve performance of subsequent runs of the data flows 732. The application 722 itself includes a conductor component 723, an operator component 725, and a monitor component 727. The conductor component 723 configures and launches processing jobs. The operator component 725 is configured to gather statistical data for each running process of the ETL processing job to create the profile data 734. The monitor component 727 stores run-time data of the job related by the conductor component 723. After the profile data 734 is generated, the conductor component 723 may load the profile data 734 and adjust parameters in an execution plan for the data flows 732 that improve the performance of the processing job.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the application 106 could execute on a computing system in the cloud and execute a data processing job with profile-based adjustments. In such a case, the application 106 could generate job profile data and store the job profile data at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
retrieving, via a processor, a job profile for a processing job, wherein the processing job has a plurality of processing stages specified in an execution profile, wherein the execution profile specifies a respective set of one or more parameters for each of one or more of the processing stages of the processing job, and wherein the job profile includes statistical data for at least one of the processing stages obtained during prior executions of the processing job, wherein the statistical data includes an amount of data that was spilled to a disk during at least one of the one or more processing stages, and wherein the statistical data was obtained by, for each of the processing stages during at least a first of the prior executions:
identifying a plurality of operations in the processing stage, and
during performance of each of the operations:
determining whether a flag is set for the operation, wherein the flag indicates to gather statistical data relating to the operation, and
upon determining that a flag is set, collecting the statistical data relating to the operation;
identifying a plurality of optimizations to apply to the execution profile based on the statistical data and based on an indication that at least a first one of the processing stages of the processing job was selected for optimization during one of the prior executions;
receiving, via a user interface, a selection of at least a first optimization of the identified optimizations to apply to the execution profile, wherein the first optimization comprises a selection of a compression algorithm;
modifying the respective set of one or more parameters of the execution profile for the at least the first one of the processing stages of the processing job by applying the selected first optimization to the at least the first one of the processing stages to optimize an execution environment used to execute the processing job; and
executing the processing job in the optimized execution environment based on the modified execution profile.

2. The method of claim 1, wherein the statistical data includes at least one of a total data size processed in the processing stages, an average record size processed by data transfer blocks, and an amount of system resource usage for each processing stage.

3. The method of claim 1, wherein the job profile was generated during a prior execution of the processing job by monitoring the processing stages during the prior execution.

4. The method of claim 1, further comprising, receiving a specification of the parameters of the execution profile which are available to modify based on the job profile.

5. The method of claim 1, wherein the job profile comprises a plurality of job profiles generated during a corresponding plurality of prior executions of the processing job.

6. The method of claim 1, wherein the processing job is an extract, transform, and load job.

7. The method of claim 1, wherein the modified respective set of one or more parameters includes at least one of a transfer block size, table chaining, and a record layout specified in the execution profile.

* * * * *